(12) United States Patent
Montplaisir et al.

(10) Patent No.: US 8,184,010 B2
(45) Date of Patent: May 22, 2012

(54) SYSTEM AND METHOD FOR RECHARGING A MOBILE, SUBMERSIBLE DEVICE

(75) Inventors: Jean-François Montplaisir, Québec (CA); Jonathan Gagne, Québec (CA); Alain Moisan, Saint-Augustin-de-Desmaures (CA)

(73) Assignee: Steelcase Inc., Grand Rapids, MI (US)

( * ) Notice: Subject to any disclaimer, the term of this patent is extended or adjusted under 35 U.S.C. 154(b) by 480 days.

(21) Appl. No.: 12/525,337

(22) PCT Filed: Feb. 14, 2008

(86) PCT No.: PCT/CA2008/000299
§ 371 (c)(1), (2), (4) Date: Jul. 31, 2009

(87) PCT Pub. No.: WO2008/098373
PCT Pub. Date: Aug. 21, 2008

(65) Prior Publication Data
US 2010/0109890 A1    May 6, 2010

(51) Int. Cl.
*G08B 21/00* (2006.01)

(52) U.S. Cl. ................ 340/636.1; 455/572; 320/134

(58) Field of Classification Search ............... 340/636.1; 455/571–574; 320/103, 134
See application file for complete search history.

(56) References Cited

U.S. PATENT DOCUMENTS

| | | | |
|---|---|---|---|
| 5,686,813 A | 11/1997 | Huen et al. | |
| 5,789,900 A * | 8/1998 | Hasegawa et al. | 320/134 |
| 6,097,973 A * | 8/2000 | Rabe et al. | 455/572 |
| 7,068,012 B1 * | 6/2006 | Geren et al. | 320/134 |
| 7,166,987 B2 | 1/2007 | Lee et al. | |
| 7,734,317 B2 * | 6/2010 | Patel et al. | 455/572 |
| 2005/0174094 A1 | 8/2005 | Purdy et al. | |
| 2005/0280398 A1 | 12/2005 | Lee et al. | |

* cited by examiner

*Primary Examiner* — John A Tweel, Jr.
(74) *Attorney, Agent, or Firm* — Price Heneveld LLP (57) ABSTRACT

There is herein described a charging unit adapted for insertion into a mobile device to enable a charging of a rechargeable battery in the mobile device, the unit comprising: at least two electrical charging contacts for receiving a potential difference from a power source; a blocking device for blocking energy leaking through the at least two electrical charging contacts and out of the rechargeable battery to ensure a neutrality of the at least two charging contacts when the charging is inactive; and a logic circuitry for controlling the charging of the rechargeable battery of the mobile device by activating the charging based on the potential difference received at the at least two electrical charging contacts.

14 Claims, 4 Drawing Sheets

SYSTEM AND METHOD FOR RECHARGING A MOBILE, SUBMERSIBLE DEVICE

FIELD OF THE ART

The invention relates to electrically rechargeable mobile devices and to methods for electrically charging such mobile devices.

BACKGROUND

Many devices and methods for recharging mobile devices generally limit at least the mobile functionality of the mobile device during the necessary recharging time. The establishment of an electrical contact with an external, often fixed in place source of energy is indeed usually required. This is the case for external energy sources such as electrical wall outlets for example. The functionality of a mobile rechargeable device during recharge is thus jeopardized or even rendered impossible using such charging methods.

Some chargers are adapted to recharge mobile devices such as cellular phones without jeopardizing the mobility of the devices during recharge. However, these chargers and methods of charging are not adapted to be able to recharge submersible mobile devices. Submersible rechargeable mobile devices further require safe, submersible electrical charging contacts. In submersion conditions, the slightest leakage of electrical energy out of surface electrical contacts necessary for recharging is undesirable in terms of safety and efficiency.

Induction-based recharging has been explored as an avenue for developing submersible charging systems and methods. Induction-based recharging however suffers from large power losses and is thus limited in terms of its applicability and flexibility.

There is thus a need to provide a charging system and method which provides for an efficient charging of a mobile rechargeable device while further ensuring safe manipulation of the mobile device in humid or underwater environmental conditions.

SUMMARY

It is therefore an aim of the present application to address issues associated with the prior art.

Therefore, in accordance with an embodiment, there is provided a system for charging a mobile device having a rechargeable battery, the system comprising: a power charge unit comprising a power source and at least two electrical contacts, the power source for supplying an electrical potential at the at least two electrical contacts, the power charge unit being removably engageable with the mobile device via the two electrical contacts; and a charging unit in the mobile device comprising at least two charging contacts for engaging with the at least two electrical contacts of the power charge unit and for receiving the electrical potential therefrom; a logic circuitry for controlling the charging of the rechargeable battery by activating the charging only when the electrical potential difference is received at the at least two charging contacts; and a blocking device for blocking energy leaking through the at least two charging contacts out of the mobile device and ensuring a neutrality of the at least two charging contacts when the charging is inactivated.

In accordance with another embodiment, there is provided a method for charging a rechargeable battery of a mobile device, the method comprising: receiving through at least two charging contacts of the mobile device an electrical potential; activating the charging of the rechargeable battery of the mobile device once the electrical potential is received through the at least two charging contacts; deactivating the charging when no electrical potential is received through the at least two charging contacts; and blocking energy leaking from the rechargeable battery upon the deactivating to ensure a neutrality of the at least two charging contacts of the mobile device when the charging is deactivated.

In accordance with yet another embodiment, there is provided a charging unit adapted for insertion into a mobile device to enable a charging of a rechargeable battery in the mobile device, the unit comprising: at least two electrical charging contacts for receiving a potential difference from a power source; a blocking device for blocking energy leaking through the at least two electrical charging contacts and out of the rechargeable battery to ensure a neutrality of the at least two charging contacts when the charging is inactive; and a logic circuitry for controlling the charging of the rechargeable battery of the mobile device by activating the charging based on the potential difference received at the at least two electrical charging contacts.

In accordance with still another embodiment, there is provided a system for charging a mobile device having a rechargeable battery, the system comprising: a charging unit in the mobile device comprising at least two charging contacts for receiving an electrical potential; and a blocking device for blocking energy leaking through the at least two charging contacts out of the mobile device and ensuring a neutrality of the at least two charging contacts when the charging is inactivated; and a removably engageable power charge unit comprising a power source for supplying the electrical potential, at least two electrical contacts for engaging with the at least two charging contacts of the power charge unit, and a logic circuitry for controlling the charging of the rechargeable battery by activating the charging only when the electrical potential difference is received at the at least two charging contacts.

In this specification, the term "recharging" and "recharging time" refers to the action and the time needed for restoring anew or substantially anew the energetic capacity of a potential energy source such as a battery or an accumulator. For example, the active materials in a battery are renewed during a recharging time such that the chemical energy stored in the battery can be made available in an electrical form to the device it powers. It will be understood that a partial recharging time leads to a partial recharging of the battery or accumulator but may still allow use of the device which is powered by the battery depending on the energy consumption of the device required for proper functioning. Therefore, partial recharging is considered to be included in "recharging" in this specification.

Further details of these and other embodiment will be apparent from the detailed description and accompanying figures.

BRIEF DESCRIPTION OF THE DRAWINGS

Reference is now made to the Figures, in which.

It will be noted that throughout the appended drawings, like features are identified by like reference numerals.

DETAILED DESCRIPTION

The present charging system and method preserves the mobile functionality of a rechargeable device during its recharging time and ensures safe isolation of the electrical contacts on surfacing the rechargeable device, along with their neutrality once the rechargeable device is removed from a portable or non-portable power source unit or power charge unit used for recharge. This allows submersible rechargeable devices such as diving equipment to be safely used in underwater conditions. The charging system and method described herein is adaptable to different mobile devices exhibiting various energy consumption rates.

Figure 1:
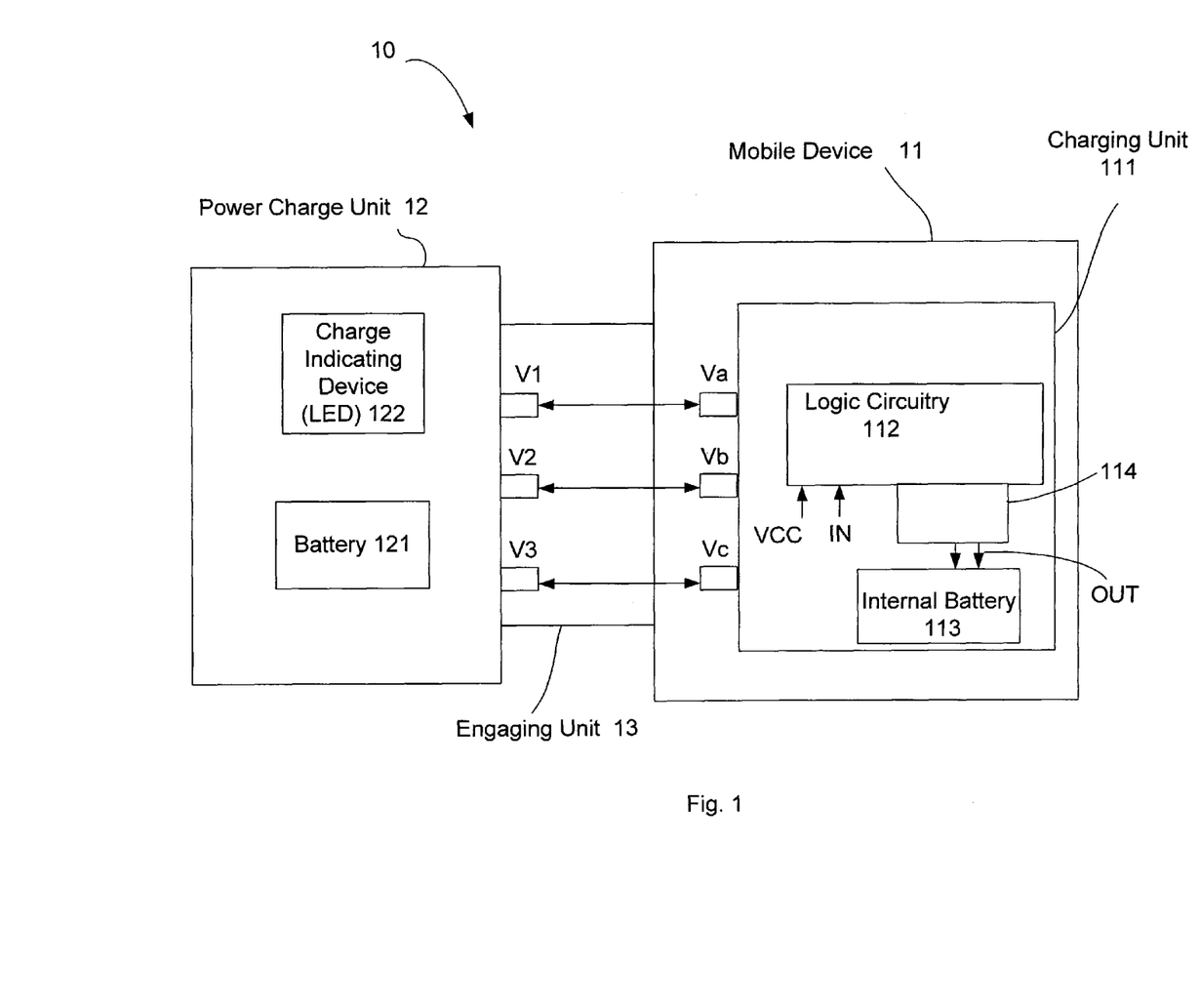
FIG. 1 is a schematic view of a system for recharging a mobile device in accordance with an embodiment.

Referring to FIG. 1, there is illustrated a charging system 10 for recharging a mobile device 11. The charging system 10 has a power charge unit 12 (also referred to as a charger or a power source unit) for charging the mobile device 11. An engaging unit 13 is optionally used to secure the device 11 to the power charge unit 12 such that no disconnection occurs during recharging time. The mobile device 11 can thus be safely carried by a user during recharge.

It is noted that the mobile device 11 can be, for example, any common mobile or portable device such as a cellular phone, a personal digital assistant (PDA), or any submersible and otherwise waterproof device such as underwater safety devices and phones, underwater precision electronic devices, various submersible sensors and other diving equipment, instruments, computers and watches.

The power charge unit 12 functions with a charging unit 111 adapted to be inserted in the mobile device 11.

The charging unit 111 has an internal logic circuitry 112, an internal rechargeable battery 113 (or a set of rechargeable batteries), and an electrical blocking device 114.

The charging unit 111 is located within the mobile device 11 in need of recharge in such a way that it may not be freely manipulated by a user of the mobile device 11.

The power charge unit 12 has a power source such as battery 121 (or a set of batteries), and a charge indicating device 122 for indicating a charging state or a charging progress.

The battery 121 of the power charge unit 12 provides both the energy to be able to charge the rechargeable battery 113 and operate the charging unit 111. Energizing the charging unit 111 enables the logic circuitry 112 and the blocking device 114 to be activated to in turn permit the recharge of the internal battery 113 of the mobile device 11. In one particular example, the battery 121 supplies energy at 600 mAH (milliampere hours) to 8.4 Volts when the battery 113 in need of recharge is made to provide 600 mAH to 4.2 Volts. Other battery specifications are also possible.

Still referring to FIG. 1, the power charge unit 12 engages on the device 11 via at least two (herein illustrated as three) electrical contacts (contacts V1, V2 and V3 of power charge unit 12, and surface charging contacts Va, Vb and Vc surfacing out of device 11). The electrical contacts are also herein referred to as terminals.

In the illustrated exemplary embodiment, the third contact serves as a charge indicator. An electrical potential difference is set across at least two of the contacts of the power charge unit 12, V1 and V2 for example, such that the internal charging unit 111 is activated when this potential difference is presented at Va and Vb (or Vb and Vc for example) of the device 11. Recharging can then take place by sending a given potential to the blocking device 114, as further detailed herein below.

The blocking device 114 can function as a switch. For example, once the switch is opened, the internal battery 113 and the power charge unit 12 are linked and charging begins. If no potential difference is applied across at least two contacts (such as Va and Vb), the blocking device 114 is closed. A closing of the switch ensures that no returning potential or current arrives at the contacts Va, Vb or Vc, thereby ensuring neutrality at the surface charging contacts and minimizing energy leakage to effectively serve as a one-way energy blocking device 114.

The electrical contacts (V1, V2 and V3 of power charge unit 12) and the surface charging contacts (Va, Vb and Vc of device 11) are made of a material which ensures a highly effective electrical connection between the power charge unit 12 and the internal charging unit 111 of the device 11 to further help in reducing the risks of energy leakage, breaks and electrolysis with any surrounding water. These contacts are thus generally made of a highly conductive and non-corrosive material such as gold and stainless steel for example.

Still referring to FIG. 1, when contacts V1, V2 and V3 of the power charge unit 12 each engage respectively to contacts Va, Vb and Vc of the mobile device 11, the charging unit 111 in the mobile device 11 can receive the potentials set at V1, V2 and V3 by the power charge unit 12 via its terminals Va, Vb and Vc respectively. The charging unit 111 uses these received potentials to set potentials at terminals VCC and IN of the logic circuitry 112. The logic circuitry 112 in turn allows the blocking device 114 to provide a recharge voltage and a recharge current to the internal battery 113 via the OUT terminal.

It is noted that the power charge unit 12 of the system 10 can alternatively be any type of mobile power source adapted to the charging of the mobile device 11. The charge indicating device 122 can also have a light emitting diode (LED), for example, or any other type of visible indicating device or display.

In addition, an alternative configuration of the system 10 allows for the mobile device 11 to have a charge indicating device 122.

Still referring to FIG. 1, the system 10 can be configured to properly operate according to various voltage settings. For example, the charging unit 111 of the mobile device 11 may present at the VCC and IN terminals of the logic circuitry 112, a potential difference higher than 3 Volts DC. In such a case, the potential difference presented at these VCC and IN terminals is in the order of about 0.3 Volts DC higher than the voltage of the internal battery 113 to be recharged.

The potential voltage supplied by the internal charging unit 111 of the mobile device 11, at the VCC terminal of the logic circuitry 112, is used to activate this logic circuitry 112.

The voltage set by the charging unit 111 at the IN terminal of the logic circuitry 112 is then used by the logic circuitry 112 to output a charging voltage at the OUT terminal of the logic circuitry 112. This charging voltage is then transmitted to the internal battery 113 requiring recharging via the blocking device 114.

The internal logic circuitry 112 also controls the charging current sent to the battery 113 through the OUT terminal. The OUT terminal can thus have two contacts, one for the charging voltage and one for the charging current. Alternatively, one contact can be used for both while a second one can serve to transmit a feedback signal from the battery 113 and to obtain a battery charge status.

The logic circuitry 112 thus controls the various charge cycles needed to maximize the recharge of the battery 113 and to avoid any electrical surcharges which could damage the battery 113 and the mobile device 11.

Still referring to the charging unit of FIG. 1, the blocking device 114 is inactivates recharging when there is no potential difference present at the VCC and IN terminals. This can be done by closing a switch for example. The two terminals VCC and IN of the logic circuitry 112 do not have any potential difference when the power charge unit 12 is removed from the device 11 in need of recharging. The removal of the power charge unit 12 from the mobile device 11 thus deactivates the logic circuitry 112 of the device 11. Removing electrical power from the logic circuitry 112 when recharging is not required reduces the energetic consumption of the device 11 and increases protection against possible accidental contact of a user with the terminals of the internal battery 113.

The blocking device 114 also blocks any returning current coming out of battery 113 of the mobile device 11 and into the logic circuitry 112.

In one embodiment for example, the blocking device 114 is made of two switches implemented as transistors. Since transistors have what is commonly referred to as parasite diodes, these essentially function as electrical blocking devices and block currents having an inversed direction.

A leakage of such inversed currents out of the mobile device 11 would induces higher risks of a user getting an electrical shock upon contact with the electrical contacts (terminals Va, Vb and Vc) of the mobile device 11. Apart from increasing user security, such blocking device 114 also reduces power consumption of the mobile device 11 by ensuring that the logic circuitry 112 does not consume electrical energy when the power charge unit 12 is disengaged from the mobile device 11.

Since the three contacts Va, Vb and Vc are linked within the mobile device 11 in need of recharging to the charging unit 111, the contacts of the battery 113 are protected from the environment. The charging unit 111 in effect isolates the three contacts Va, Vb and Vc. These can thus be safely exposed to the exterior environment.

As detailed above, when at least two of the three contacts Va, Vb and Vc are not subject to a potential difference, the link between the power charge unit 12 and the internal battery 113 is not established due to the blocking device 114. Under such conditions, no charging voltage and charging current is transmitted to the internal battery 113. Current escaping through the surface terminals Va, Vb, Vc is also blocked by the blocking device 114.

When electrical charging is in progress, the charging unit 111 optionally controls the charge indicating device 122 of either one of the power charge unit 12 and mobile device 11.

When the battery 113 is completely recharged, the charging unit 111 turns the charge indicating device 122 off or indicates to users that charging is complete via any type of displaying means. A charging state, an indication of a charging progress or any technical specification can also be displayed on the indicating device 122.

Figure 3:
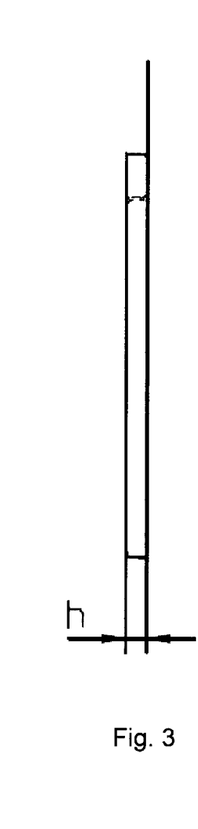
FIG. 3 is a side elevation view of any one of the batteries of FIG. 1.
Figure 4:
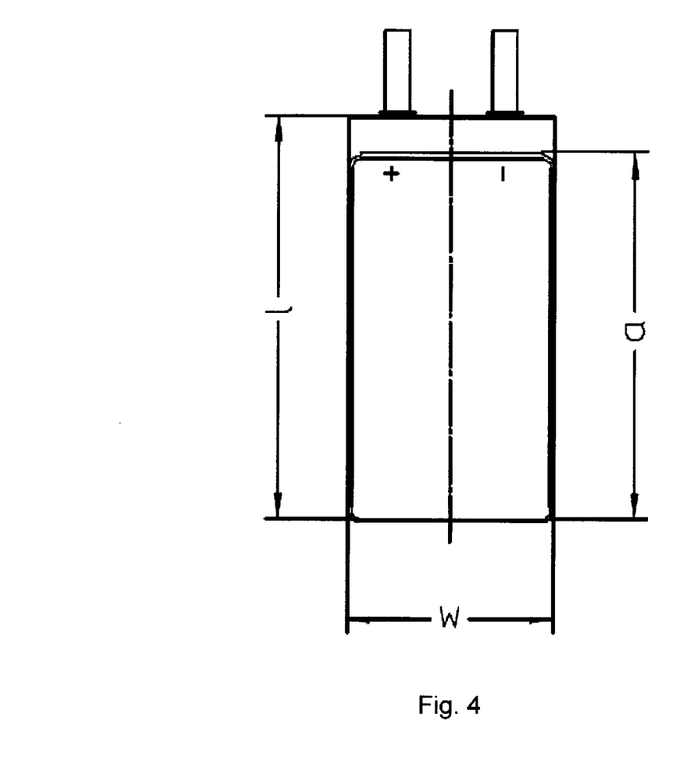
FIG. 4 is a front elevation view of the battery of FIG. 3.

Still referring to FIG. 1, the battery 113 and 121 can be batteries of various types. In one example, lithium-polymer rechargeable batteries are used. A possible battery model is the PLF 443441 produced by VARTA Microbattery GmbH. Other models and types are also possible. In one specific example, the battery 113 can have a nominal voltage averaged at 3.7 Volts, with a typical capacity of 550 mAh. The dimensions of the batteries 113 and 121 can also vary. In one example, and referring to FIG. 3 and FIG. 4, a battery can have a length (l) of approximately 41 mm, a width (w) of 34 mm, a height (h) of 4.4 mm, and a pouch (a) of 36 mm. Battery weights can vary as well. In one example, the battery weight is of the order of ten grams. Batteries can be chosen depending on each specific application.

Charging parameters of the charging system 10 can also vary with the batteries used. Typical batteries require a constant charging current and constant charging voltage. For example, the battery 113 can be chosen to require a charging voltage of 4.2 Volts+/−50 mV.

The logic circuitry 112 can be a single-chip, Li-Ion charge management integrated circuit used for handheld applications, such as model BQ24013 produced by Texas Instruments. The logic circuitry 112 can however be formed by a combination of electrical circuits on more than one chip and follow various topologies.

In one example, the logic circuitry 112 has a 3 mm by 3 mm size, and is compatible with mobile devices such as cellular phones. The logic circuitry 112 optionally has a built-in reverse leakage protection device to prevent battery drainage. The circuitry 112 regulates the charging voltage and current to the internal battery 113 and may also provide short circuit protection.

System 10 permits a recharging of a mobile rechargeable device 11 while in a mobile use, and a subsequent safe usage of the mobile rechargeable device 11 in underwater or highly humid conditions, or in a situation where an energy leakage out of surface contacts is undesirable and possibly has the potential to harm a user or cause damage.

An initial charge of the power charge unit 12 is first required if the power charge unit 12 is portable and the battery 121 is rechargeable. Once the power charge unit 12 is charged, it is engaged to a mobile device 11 in need of recharge and charging of its internal battery 113 is accomplished while the mobile device 11 remains in a mobile use.

Figure 2:
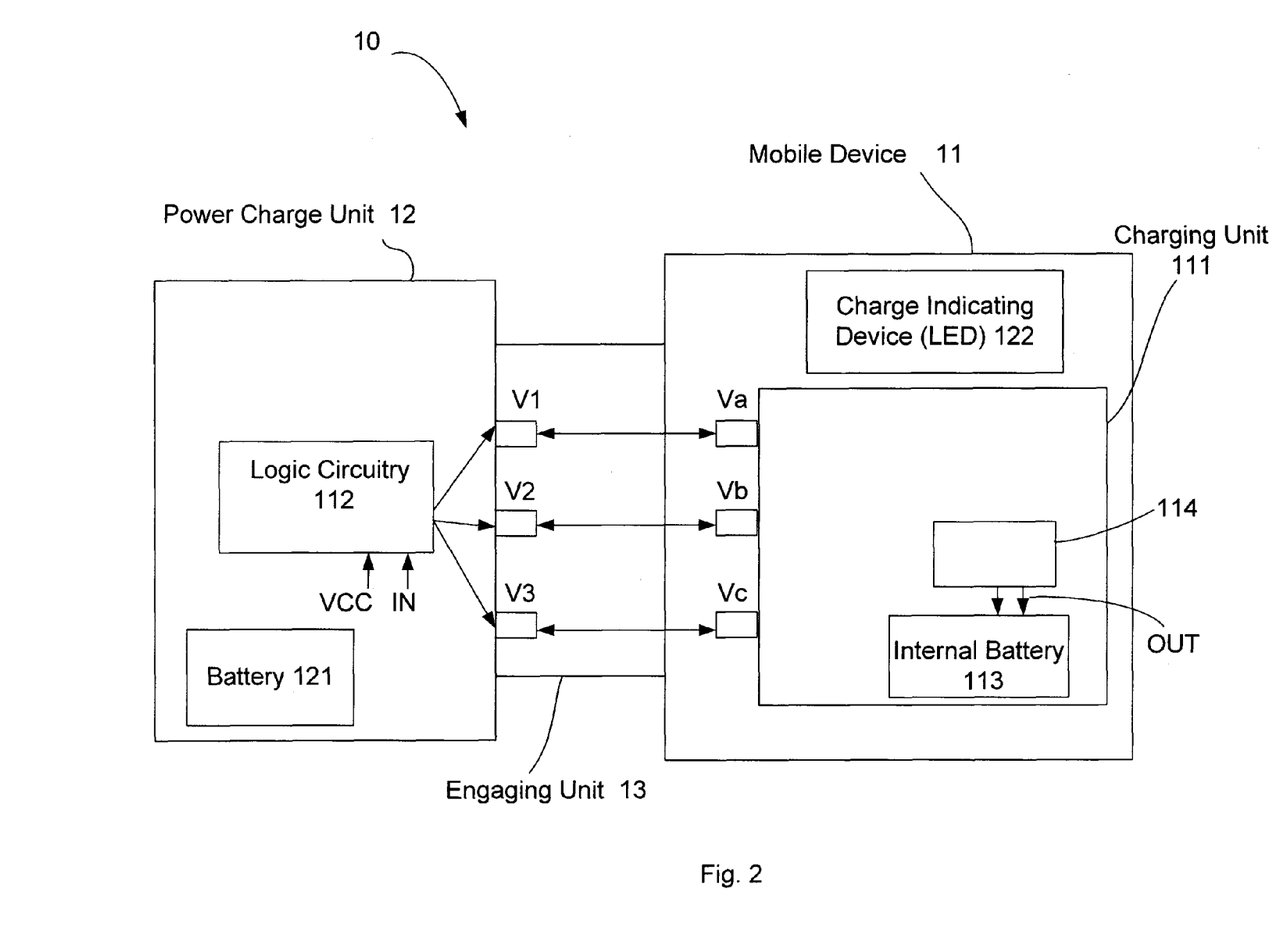
FIG. 2 is a schematic view of the system for recharging a mobile device as in FIG. 1, with the logic circuitry of FIG. 1 in the power charge unit and the charge indicating device of FIG. 1 in the mobile device.

Now referring to FIG. 2, there is shown a system 10 similar to that of FIG. 1 but in accordance with an embodiment wherein the circuitry which controls the charging of the mobile device's rechargeable battery 113 is effectively in the power charge unit 12 instead of being in the mobile device 11. There is thus the option to either insert the logic circuitry 112 in the mobile device 11 or in the power charge unit 12. The logic circuitry 112 can even be partially integrated with both the power charge unit 12 and charging unit 111 of the mobile device 11. In the illustrated case, the charging unit 111 in the mobile device 11 only comprises the blocking device 114 and the internal battery 113. The circuitry in the charging unit 111 is therefore no longer responsible for the control of the charging as it is done from the removable power charge unit 12. Also shown in FIG. 2 is the charge indicating device 122, which can also be within any one of the power charge unit 12 and the mobile device 11.

Figure 5:
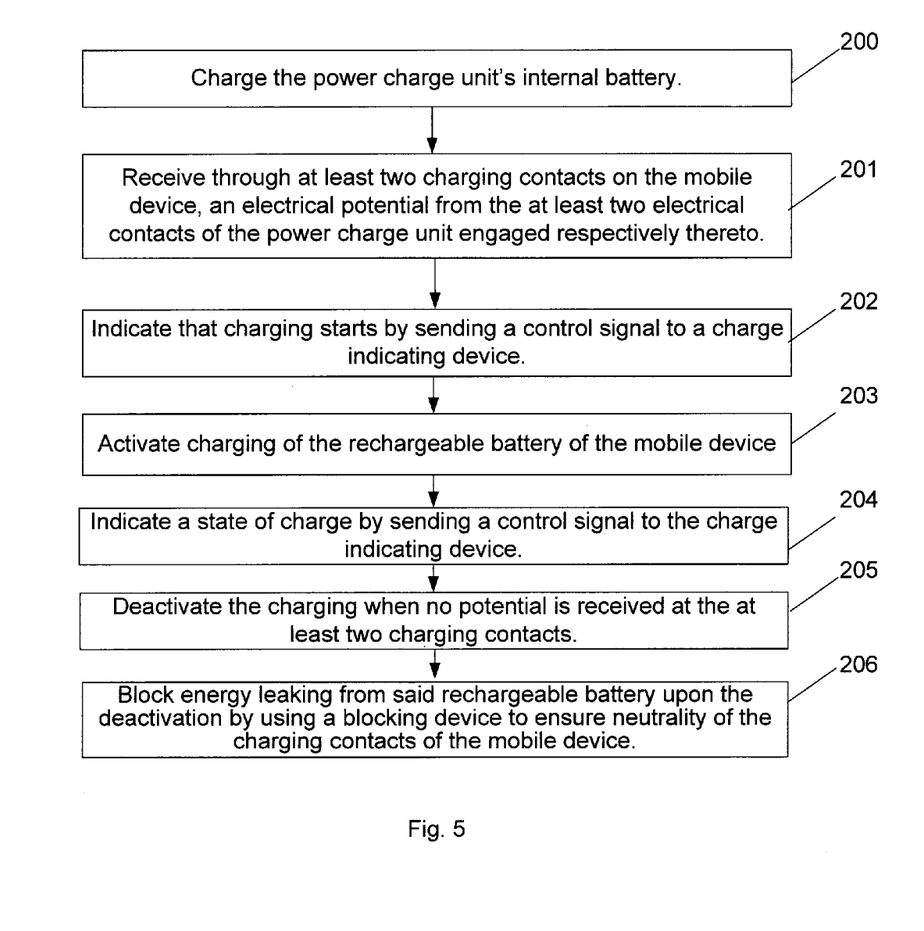
FIG. 5 is a flow chart illustrating a method for recharging a mobile device in accordance with another embodiment.

FIG. 5 illustrates the steps of a method for recharging a mobile device 11. Reference is made to the system as illustrated in FIG. 1. Note that a similar method is implied from the system as in FIG. 2.

In step 200, the charging unit's 12 battery 121 is charged using conventional means (mural power outlets and cable connected to the charging unit).

In step 201, the mobile device 11 receives through at least two charging contacts (Va, Vb, Vc, etc. . . . ) on the mobile device, an electrical potential from the at least two electrical contacts (V1, V2, V3, etc. . . . ) of the power charge unit 12 engaged respectively thereto.

Alternatively, step 201 can be divided in the two following steps: (1) the power charge unit 12 is engaged on the mobile device 11 such that at least two or more electrically conductive surface contacts (V1, V2 and V3) of the power charge unit 12 are securely engaged to respective contacts (Va, Vb and Vc) of the mobile device 11. An optional engaging unit 13 is used to secure the mobile device 11 and the power charge unit 12 together to prevent undesired disconnection during charging. The engaging unit 13 can be any type of removably attaching mechanism such as a clipping device for example.

In the second alternative step (2), a potential difference is established and supplied by the power charge unit 12 and applied to the charging unit 111 of the mobile device 11. This potential difference is originally supplied by the battery 121 of the power charge unit 12 and sent via at least two surface contacts between the device 11 and the power charge unit 12. The potential difference is used by the charging unit 111 to activate the charging of the battery 113 of the device 11 by activating the blocking device 114, or by opening a switch, in the charging unit 111. In step 202, a control signal is sent to a charge indicating device 122 to indicate that charging is in progress. This control signal can be sent by the mobile device's charging unit 111 or by a circuitry within the power charge unit 12 which receives a feedback signal from the mobile device 11 through a third contact. The control signal can be sent in a real-time fashion to indicate the current state or level of charging, the time left, or any other pertinent information.

In step 203, the charging of the rechargeable battery 113 of the mobile device 11 is activated and the battery 113 is recharged by the charging unit 111. In this step, for example, the charging unit 111 can send a potential difference initially received at one of its at least two terminals, along with a controlled charging current to the mobile device's battery 113. The charging of the battery 113 can be further controlled by an internal logic circuitry 112 setting a charging voltage and current using the potential difference established at the two electrical contacts of the charging unit 111.

In step 204, when charging is complete, a control signal is sent to the charge indicating device 122 to indicate that the device 11 is charged.

In step 205, the power charge unit 12 is disengaged (usually when the device 11 is at least partly or completely charged). This disengaging in turn deactivates the blocking device 114 or if the blocking device is a switch, closes the switch; no potential difference is present at the surface contacts of the mobile device 11 upon disengagement.

In step 206, voltages or currents escaping out of the mobile device 114, out of the charging unit 111 and rechargeable battery 113 are blocked using the blocking device 114 when the charging does not take place or is inactive, such as when the power charge unit is disengaged from the mobile device.

It is understood that several other embodiments of the system and method for recharging a mobile device may be implemented, and thus fall within the scope of the present invention. Those skilled in the art will recognize that other protective switches or devices may be used for ensuring that no potentials are made free to return to the surface terminals (Va, Vb or Vc) of the mobile device 11 at least under non-charging conditions. Examples of other protective energy blocking devices include but are not limited to micro-relays or relays and other types of transistors or switches.

A skilled person in the art will also recognize that changes can be made to the embodiments described herein without department from the scope of the application. Modifications which fall within the scope of the application will be apparent to those skilled in the art, in light of a review of this disclosure, and such modifications are intended to fall within the scope of the appended claim.

What is claimed is:

1. A system for charging a mobile device having a rechargeable battery, the system comprising:
   a power charge unit comprising a power source and at least two electrical contacts, said power source for supplying an electrical potential at the at least two electrical contacts, said power charge unit being removably engageable with the mobile device via the two electrical contacts; and
   a charging unit in said mobile device comprising
      at least two charging contacts for engaging with said at least two electrical contacts of the power charge unit and for receiving the electrical potential therefrom;
      a logic circuitry for controlling the charging of the rechargeable battery by activating the charging only when the electrical potential difference is received at the at least two charging contacts; and
      a blocking device for blocking energy leaking through said at least two charging contacts out of said mobile device and ensuring a neutrality of the at least two charging contacts when the charging is inactivated.

2. The system as in claim 1, wherein the blocking device comprises a switch.

3. The system as in claim 1, wherein the at least two electrical contacts comprise three electrical contacts, and wherein the at least two charging contacts comprise three charging contacts.

4. The system as in claim 1, further comprising an engaging device for preventing said power charge unit from being disengaged from said mobile device.

5. The system as in claim 1, further comprising a charge indicating device located on at least one of said mobile device and said power charge unit, for indicating a charging state of said mobile device.

6. The system as in claim 5, wherein said charge indicating device comprises a light-emitting diode.

7. A method for charging a rechargeable battery of a mobile device, the method comprising:
   receiving through at least two charging contacts of the mobile device an electrical potential;
   activating the charging of the rechargeable battery of the mobile device once the electrical potential is received through the at least two charging contacts;
   deactivating the charging when no electrical potential is received through the at least two charging contacts; and
   blocking energy leaking from the rechargeable battery upon the deactivating to ensure a neutrality of the at least two charging contacts of said mobile device when the charging is deactivated.

8. The method as in claim 7, wherein said deactivating comprises deactivating as a result of a disengagement of a device from the at least two charging contacts of said mobile device.

9. The method as in claim 7, wherein said activating and said deactivating each comprises toggling a switch between an opened and a closed state respectively, the switch blocking currents flowing towards the at least two charging contacts.

10. The method as in claim 7, further comprising sending a control signal to a charge indicating device adapted to display a charging state of said rechargeable battery based on the control signal.

11. A charging unit adapted for insertion into a mobile device to enable a charging of a rechargeable battery in the mobile device, the unit comprising:

at least two electrical charging contacts for receiving a potential difference from a power source;
a blocking device for blocking energy leaking through the at least two electrical charging contacts and out of the rechargeable battery to ensure a neutrality of the at least two charging contacts when the charging is inactive; and
a logic circuitry for controlling the charging of the rechargeable battery of the mobile device by activating the charging based on the potential difference received at the at least two electrical charging contacts.

12. The unit as in claim 11, wherein the blocking device comprises a switch.

13. The unit as in claim 11, wherein the at least two electrical charging contacts comprise three electrical charging contacts, one of the three electrical charging contacts communicating a status of the charging of the rechargeable battery to a charge indicating device.

14. A system for charging a mobile device having a rechargeable battery, the system comprising:

a charging unit in said mobile device comprising
　at least two charging contacts for receiving an electrical potential; and
　a blocking device for blocking energy leaking through said at least two charging contacts out of said mobile device and ensuring a neutrality of the at least two charging contacts when the charging is inactivated; and
a removably engageable power charge unit comprising a power source for supplying said electrical potential, at least two electrical contacts for engaging with said at least two charging contacts of the power charge unit, and a logic circuitry for controlling the charging of the rechargeable battery by activating the charging only when the electrical potential difference is received at the at least two charging contacts.

\* \* \* \* \*

UNITED STATES PATENT AND TRADEMARK OFFICE
CERTIFICATE OF CORRECTION

PATENT NO. : 8,184,010 B2  
APPLICATION NO. : 12/525337  
DATED : May 22, 2012  
INVENTOR(S) : Montplaisir et al.

Page 1 of 1

It is certified that error appears in the above-identified patent and that said Letters Patent is hereby corrected as shown below:

Title Page, Item (73), "Assignee: Steelcase, Inc., Grand Rapids, MI (US)" should be
--Assignee: Recherche et Developpement Everon Ca Inc., Quebec, Canada--

Signed and Sealed this
Second Day of October, 2012

David J. Kappos
*Director of the United States Patent and Trademark Office*